Sept. 25, 1956    D. E. WIEGAND    2,764,732
ELECTRO-MAGNETIC CAPACITIVE DEVICE
Filed Nov. 12, 1952    3 Sheets-Sheet 1

INVENTOR.
David E. Wiegand
BY Arnold J. Ericsen
Attorney

Sept. 25, 1956  D. E. WIEGAND  2,764,732
ELECTRO-MAGNETIC CAPACITIVE DEVICE
Filed Nov. 12, 1952  3 Sheets-Sheet 2

INVENTOR.
David E. Wiegand
BY
Attorney

Sept. 25, 1956  D. E. WIEGAND  2,764,732
ELECTRO-MAGNETIC CAPACITIVE DEVICE
Filed Nov. 12, 1952  3 Sheets-Sheet 3

INVENTOR.
David E. Wiegand
BY
Attorney

United States Patent Office 2,764,732
Patented Sept. 25, 1956

---

2,764,732

ELECTRO-MAGNETIC CAPACITIVE DEVICE

David E. Wiegand, Villa Park, Ill., assignor to McGraw Electric Company, Milwaukee, Wis., a corporation of Delaware Application November 12, 1952, Serial No. 320,037

9 Claims. (Cl. 323—117)

---

This invention relates to capacitors, and especially pertains to an electro-mechanical capacitive device for power factor correction.

It is an object of this invention to provide an electromechanical vibratory device, which device may be used as a power factor correcting means.

It is another object of this invention to provide a vibratory device responsive to cyclic variations in an A. C. circuit, and which is laterally movable within an established magnetic field to provide power factor correction.

A more complete understanding of the novel features of this invention may be had from the accompanying illustrative drawings detailed description, in which:

Fig. 1 is an elevational view, partly in section of a simple tuning fork used as a vibratory means, and which is driven by A. C. driving coils positioned in the proximity of the free ends of the tuning fork tines, and arranged to vibrate at substantially the same frequency as the A. C. supply.

Figure 1:
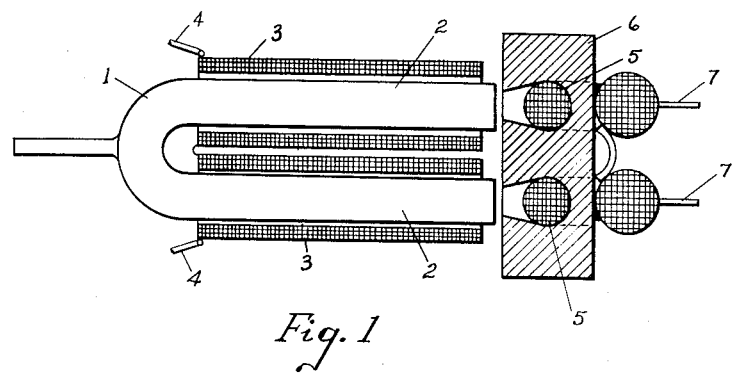

In detail, there is disclosed in Fig. 1, a tuning fork 1 having vibratory armatures in the form of tines 2. Each of the tines preferably has a series connected field coil 3 circumjacent thereto. Direct current may be supplied to the coils through the supply leads 4 as a source of field excitation. However, it is within the scope of this invention to provide a tuning fork (not shown) which has its tines permanently magnetized.

Alternating current driving coils 5, mounted within a core 6, are positioned in the proximity of the free ends of the tines 2. The coils 5 may be doughnut-shaped as shown, and are electrically connected to each other and through leads 7 to the electric line which is to be corrected for power factor deviations.

Figure 2:
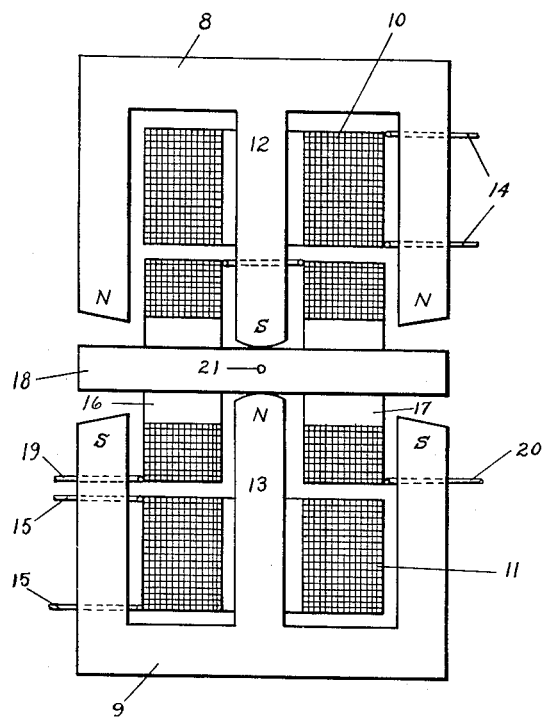
Fig. 2 is an elevational view, partly in section, illustrating a pivoted vibratory device utilizing E-shaped magnetic cores as a means for providing a magnetic field with a fixed polarity.

The embodiment of Fig. 2 is illustrative of another conveniently arranged structure which will function effectively according to this invention, and includes opposed E-shaped field cores 8 and 9 having field coils 10 and 11 wound circumjacent to the center legs 12 and 13 respectively. The coils 10 and 11 are supplied with current from a D. C. source through leads 14 and 15. A. C. driving coils 16 and 17 are series connected and are preferably positioned coaxially of one another and of a pivoted armature 18. The D. C. field coils 10 and 11 are wound to provide a fixed magnetic polarity, as shown.

It will be apparent that when an alternating current supply line is connected to the driving coils 16 and 17 through leads 19 and 20, the armature 18 will be caused to rock about its pivot point 21 according to the variations in flux direction provided by the A. C. driving coils 16 and 17.

Figure 3:
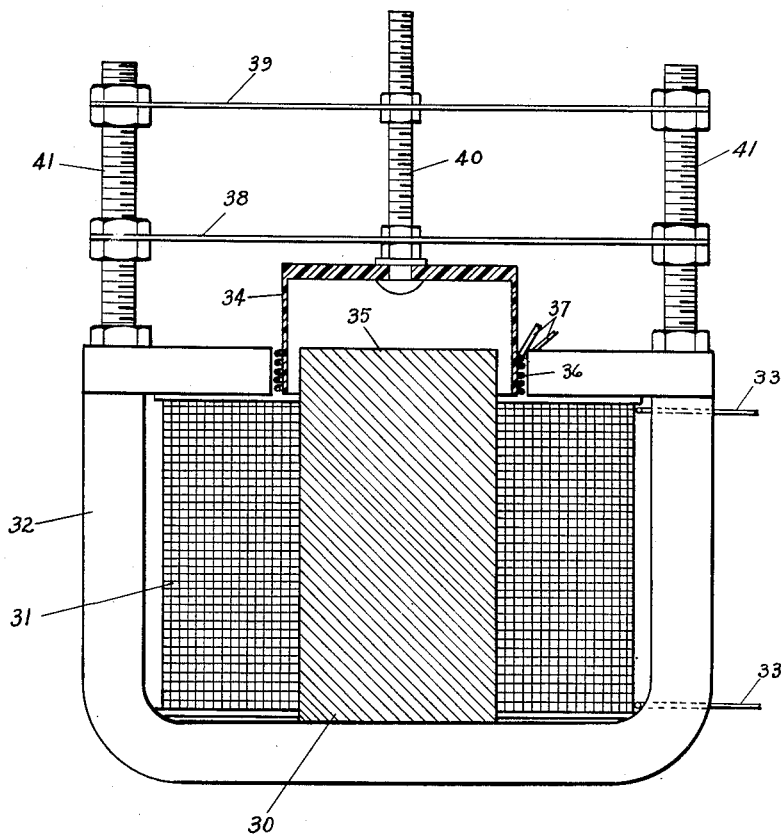
Fig. 3 is an elevational view, partly in section, illustrating another embodiment of the present invention.

Another embodiment of this invention is disclosed in Fig. 3, wherein a cylindrical-shaped core 30 is provided with a field coil 31 wound circumjacent thereto. The core and coil assembly may be mounted in an appropriate supporting structure 32, as shown. The coil 31 is preferably supplied with direct current through leads 33 to provide a magnetic field of fixed polarity in the core 30, although it is feasible that the core may be permanently magnetized.

A vibratory mass 34 is shown suspended in the proximity of a protruding portion 35 of the core 30. The mass 34 may simply consist of a cup-like insulator of Bakelite or similar material, having an alternating current coil 36 wound about the peripheral surface thereof. This coil 36 is connected with the supply current that is to be corrected for power factor deviations through the leads 37.

As shown, the mass 34 is suspended from leaf springs 38 and 39, and is held in place by a bolt and nut assembly 40. The leaf springs are supported at either end by the studs 41.

Although the embodiment of Fig. 3 is shown with the moving mass 34 suspended by the leaf springs 38 and 39, it is within the scope of this invention to provide a moving mass consisting substantially of conductive windings loosely held within the proximity of the protruding portion 35 of the core 30 (not shown). The leaf springs are merely used as a means of providing a desired mass effect for predetermined conditions. It will be obvious that the mass will move longitudinally of the core 30 in response to alternating current cyclic variations without the aid of the leaf springs.

Figure 4:
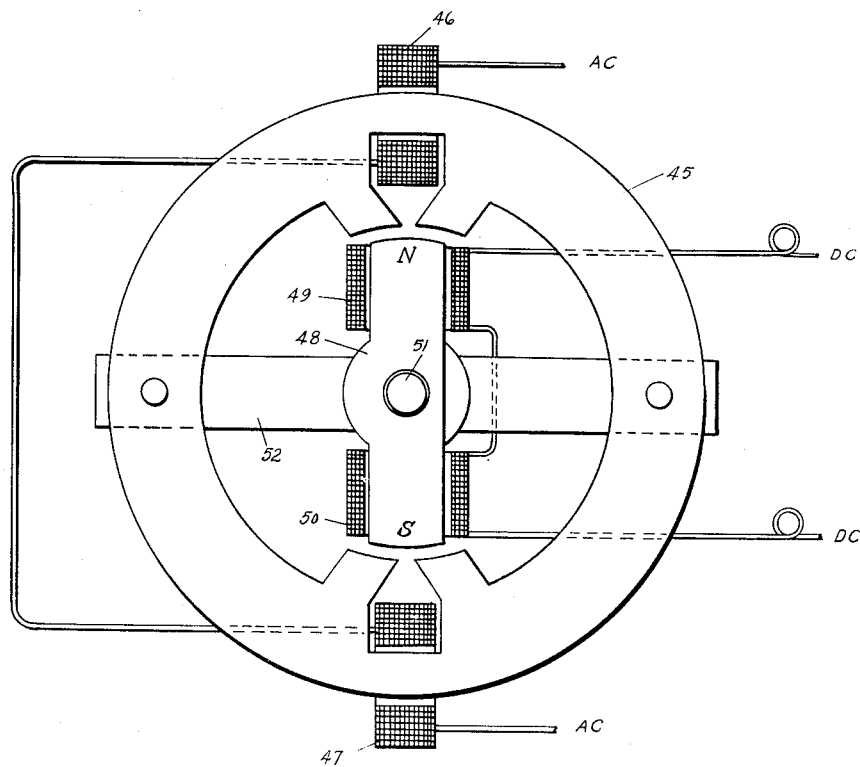
Fig. 4 is an elevational view, partly in section, illustrating a further embodiment of the present invention.

Referring now to Fig. 4, wherein a dynamically balanced structure has been illustrated, an armature comprising closed ring core 45 is provided with diametrically opposed series connected armature coils 46 and 47 positioned thereon. The armature coils are normally connected to the A. C. line to be corrected for power factor deviations. The field structure comprises a field magnet 48 which may be permanently magnetized or which may have series connected field coils 49 and 50 wound thereon. The field structure and the armature are preferably rotatably positioned on a pivot member 51 which is stationarily supported (not shown). The armature is supported on the pivot member by means of a diametric support member 52.

In operation, the field structure and armature will vibrate in opposed directions relative to one another. Obviously, this dynamic balance will materially reduce vibratory reaction forces which tend to cause irritating noise and vibration, especially where the device may be mounted on a pole or platform. If it is desired to eliminate bearings because of lubrication and wear problems, the field structure and armature may be individually mounted to the stationary base by means of torsion springs (not shown). If the springs are chosen with their stiffness in direct proportion to the moments of inertia of the masses they support, zero net torque will be transmitted to the mounting structure.

Operation of each of the various devices is based on a common theory. A vibrating mass being driven by an electro-magnetic transducer reacts with the driving circuit in such a way that an apparent motional impedance appears across the terminals of the electrical driving unit. It is well-known in the art that this impedance is inductive, resistive, or capacitive depending on whether the natural mechanical resonance frequency of the vibrating mass is above, at, or below the frequency of the driving current. In my invention, I select a frequency of mechanical resonance a suitable amount below the line frequency so that a substantial leading current is drawn by the device, thus correcting for lagging power factor deviations in the power line.

It is also within the province of this invention to provide a D. C. field with the use of permannet magnets (not shown). For instance, in the embodiment of Fig. 2 of the cores 8 and 9 may be in the form of three-legged magnets of Alnico metal or similar permanent magnet material (not shown). Obviously, the size, shape, retentivity and coercivity of the field core would be dependent upon the degree of excitation desired.

In addition to providing a predetermined field excitation, it will be apparent that inherent resonating characteristics of the movable member will affect the operation of the device and influence the capacitive reactance accordingly. This is especially true of the embodiment of Fig. 1, wherein the tuning fork may be preselected to have a natural mechanical resonance on optimum amount below the normal A. C. supply frequency consistant with stability. This natural resonance of the movable members of the embodiments of Figs. 2, 3, and 4 may be made dependent upon the mass and/or attached resilient members, such as the leaf springs of Fig. 3.

I claim:

1. An electro-magnetic device for correcting power factor in an alternating current electric line comprising in combination a reciprocable magnetic armature, an energizing winding arranged for connection with said alternating current electric line and being positioned circumjacently to said armature, a core and coil assembly including at least one E-shaped core positioned in the proximity of the longitudinal dimension of said armature for providing a magnetic field, said armature being laterally movable in a direction substantially parallel to said magnetic field, whereby the effective impedance reflected into said alternating current electric line by the cyclic motion of said armature is of the capacitive sense, thereby causing a leading current to flow in said energizing winding, said leading current thereby correcting for lagging power factor deviations in said alternating current electric line.

2. An electro-magnetic device for correcting power factor in an alternating current electric line comprising in combination a reciprocable magnetic armature, an energizing winding arranged for connection with said alternating current electric line and being positioned circumjacently to said armature, a core and coil assembly for providing a magnetic field and arranged for connection with a source of direct current and comprising opposed E-shaped cores positioned on either side of said armature, said armature being laterally movable in a direction substantially parallel to said magnetic field, whereby the effective impedance reflected into said alternating current electric line by the cyclic motion of said armature is of the capacitive sense, thereby causing a leading current to flow in said energizing winding, said leading current thereby correcting for lagging power factor deviations in said alternating current electric line.

3. An electro-magnetic device for correcting power factor in an alternating current electric line comprising in combination a resilient vibratory member having a fixed end, means for producing a fixed magnetic field in said vibratory member, an energizing winding energized from said electric line for alternatingly actuating said vibratory member responsive to cyclic variations in said electric line and being operatively associated with said vibratory member to cause an effective motional impedance of the capacitive sense to be reflected in said alternating current electric line by the cyclic motion of said vibratory member, thereby causing a leading current to flow in said energizing winding so as to produce a desired power factor correction in said electric line.

4. An electro-magnetic device for correcting power factor in an alternating current electric line comprising in combination a resilient vibratory member having a fixed end, a field winding operatively associated with said member for producing a fixed magnetic field in said vibratory member, an energizing winding energized from said electric line for alternatingly actuating said vibratory member responsive to cyclic variations in said electric line and being operatively associated with said vibratory member to cause an effective motional impedance of the capacitive sense to be reflected in said alternating current electric line by the cyclic motion of said vibratory member, thereby causing a leading current to flow in said energizing winding so as to produce a desired power factor correction in said electric line.

5. An electro-magnetic device for correcting power factor in an alternating current electric line comprising in combination a U-shaped vibratory member comprising opposed resilient leg portions having a fixed magnetic polarity produced therein, an energizing winding energized from said electric line for alternatingly actuating said vibratory member responsive to cyclic variations in said electric line and being operatively associated with said vibratory member to cause an effective motional impedance of the capacitive sense to be reflected in said alternating current electric line by the cyclic motion of said vibratory member, thereby causing a leading current to flow in said energizing winding so as to produce a desired power factor correction in said electric line.

6. An electro-magnetic device for correcting power factor in an alternating current electric line comprising in combination a magnetic field structure, an armature, said field structure and said armature each being pivotally positioned coaxially of one another and each alternatingly rotatable relative to one another, means for producing a fixed magnetic polarity in said field structure, and an energizing winding energized from said electric line for supplying an alternating polarity in said armature responsive to cyclic variations in said electric line, whereby the relative alternating rotational motion of the field structure and armature causes an effective motional impedance of the capactive sense to be reflected in said alternating current electric line by the cyclic motion of said vibratory member, thereby causing a leading current to flow in said energizing winding so as to produce a desired power factor correction in said electric line.

7. An electro-magnetic device for correcting power factor in an alternating current electric line comprising in combination a magnetic field structure, an armature, said field structure and said armature each being pivotally positioned coaxially of one another and each alternatingly rotatable relative to one another, a field winding operatively associated with said field structure for producing a fixed magnetic polarity in said field structure, and an energizing winding energized from said electric line for supplying an alternating polarity in said armature responsive to cyclic variations in said electric line, whereby the relative alternating rotational motion of the field structure and armature causes an effective motional impedance of the capacitive sense to be reflected in said alternating current electric line by the cyclic motion of said vibratory member, thereby causing a leading current to flow in said energizing winding so as to produce a desired power factor correction in said electric line.

8. In an electromagnetic device for correcting power factor in an alternating current electric line, the combination of a first electrical winding carrying the alternating current in said line, a second electrical winding arranged for energization from a source of direct current, a reciprocable ferromagnetic member carrying one of said windings and having an amplitude of vibration of less than 180 degrees, the natural mechanical resonance frequency of said member with said winding mounted thereon being less than the frequency of said alternating current.

9. An electromagnetic device for correcting power factor in an alternating current electric line, the combination of a first electrical winding having two series electrically connected coil portions, a second electrical winding, one of said windings carrying the alternating current in said line and the other winding being arranged for energization from a source of direct current, a reciprocable ferromagnetic member having an amplitude of vibration of less than 180 degrees, said coil portions being circumjacent said member and in spaced apart relationship, the natural mechanical resonance frequency of said member having said coils mounted thereon being less than the frequency of said alternating current.

References Cited in the file of this patent

UNITED STATES PATENTS

| | | |
|---|---|---|
| 644,555 | Hutin et al. | Feb. 27, 1900 |
| 1,236,716 | Kapp | Aug. 14, 1917 |
| 2,152,955 | Coyne | Apr. 4, 1939 |